(12) United States Patent
Goran et al.

(10) Patent No.: US 11,940,396 B2
(45) Date of Patent: Mar. 26, 2024

(54) METHOD FOR IMPROVING AN EBSD/TKD MAP

(71) Applicant: BRUKER NANO GMBH, Berlin (DE)

(72) Inventors: Daniel Radu Goran, Berlin (DE); Thomas Schwager, Berlin (DE)

(73) Assignee: Bruker Nano GmbH, Berlin (DE)

( * ) Notice: Subject to any disclaimer, the term of this patent is extended or adjusted under 35 U.S.C. 154(b) by 41 days.

(21) Appl. No.: 17/608,635

(22) PCT Filed: May 5, 2020

(86) PCT No.: PCT/EP2020/062373
§ 371 (c)(1),
(2) Date: Nov. 3, 2021

(87) PCT Pub. No.: WO2020/225234
PCT Pub. Date: Nov. 12, 2020

(65) Prior Publication Data
US 2022/0221412 A1    Jul. 14, 2022

(30) Foreign Application Priority Data

May 8, 2019  (EP) ..................................... 19173309

(51) Int. Cl.
*G01N 23/20008*    (2018.01)
*G01N 23/20*    (2018.01)
(Continued)

(52) U.S. Cl.
CPC ... *G01N 23/2055* (2013.01); *G01N 23/20008* (2013.01); *G01N 23/20025* (2013.01);
(Continued)

(58) Field of Classification Search
CPC ....... G01N 23/20008; G01N 23/20025; G01N 23/20058; G01N 23/20091; G01N 23/22;
(Continued)

(56) References Cited

U.S. PATENT DOCUMENTS 5,466,934 A * 11/1995 Adams ................. G01N 23/203
250/307
5,557,104 A * 9/1996 Field .................... G01N 23/203
250/306
(Continued)

OTHER PUBLICATIONS

Brewick et al., "NLPAR: Non-local smoothing for enhanced EBSD pattern indexing", Untramicroscopy, vol. 200, pp. 50-61, Feb. 19, 2019.
(Continued)

*Primary Examiner* — Allen C. Ho
(74) *Attorney, Agent, or Firm* — Norris McLaughlin, P.A.

(57) ABSTRACT

A method for improving the quality/integrity of an EBSD/TKD map, wherein each data point is assigned to a corresponding grid point of a sample grid and represents crystal information based on a Kikuchi pattern detected for the grid point; comprising determining a defective data point of the EBSD/TKD map and a plurality of non-defective neighboring data points, comparing the position of Kikuchi bands of a Kikuchi pattern detected for a grid point corresponding to the defective data point with the positions of bands in at least one simulated Kikuchi pattern corresponding to crystal information of the neighboring data points and assigning the defective data point the crystal information of one of the plurality of neighboring data point based on the comparison.

14 Claims, 2 Drawing Sheets

(51) Int. Cl.

| | | |
|---|---|---|
| *G01N 23/20025* | (2018.01) | |
| *G01N 23/20058* | (2018.01) | |
| *G01N 23/20091* | (2018.01) | |
| *G01N 23/203* | (2006.01) | |
| *G01N 23/205* | (2018.01) | |
| *G01N 23/2055* | (2018.01) | |
| *G01N 23/207* | (2018.01) | |
| *G01N 23/2206* | (2018.01) | |
| *G01N 23/2252* | (2018.01) | |
| *G01N 23/2254* | (2018.01) | |
| *G06V 10/48* | (2022.01) | |

(52) U.S. Cl.
CPC .. *G01N 23/20058* (2013.01); *G01N 23/20083* (2013.01); *G01N 23/20091* (2013.01); *G01N 23/203* (2013.01); *G01N 23/205* (2013.01); *G01N 23/207* (2013.01); *G01N 23/2206* (2013.01); *G01N 23/2252* (2013.01); *G01N 23/2254* (2013.01); *G06V 10/48* (2022.01); *G01N 2223/053* (2013.01); *G01N 2223/056* (2013.01); *G01N 2223/0565* (2013.01); *G01N 2223/0566* (2013.01); *G01N 2223/071* (2013.01); *G01N 2223/079* (2013.01); *G01N 2223/08* (2013.01); *G01N 2223/102* (2013.01); *G01N 2223/401* (2013.01); *G01N 2223/605* (2013.01); *G01N 2223/607* (2013.01)

(58) Field of Classification Search
CPC .......... G01N 23/2204; G01N 23/2206; G01N 23/2208; G01N 23/225; G01N 23/2251; G01N 23/2252; G01N 23/2254; G01N 23/227; G01N 23/2273; G01N 2223/056; G01N 2223/0561; G01N 2223/0563; G01N 2223/0565; G01N 2223/0566; G01N 2223/071; G01N 2223/079; G01N 2223/08; G01N 23/20; G01N 23/20083; G01N 23/203; G01N 23/205; G01N 23/2055; G01N 23/207; G01N 2223/102; G01N 2223/401; G01N 2223/605; G01N 2223/607
USPC .......................................... 378/44–50, 70–90
See application file for complete search history.

(56) References Cited

U.S. PATENT DOCUMENTS

| | | | | |
|---|---|---|---|---|
| 6,326,619 B1 * | 12/2001 | Michael | .............. | H01J 37/2955 250/307 |
| 6,555,817 B1 * | 4/2003 | Rohde | .................. | G01N 23/203 250/311 |
| 6,748,345 B2 * | 6/2004 | Chou | .................. | G01N 23/2251 378/70 |
| 6,935,552 B2 * | 8/2005 | Komai | .............. | G01N 23/2251 228/103 |
| 7,342,225 B2 * | 3/2008 | Houge | .................. | G01N 23/203 250/306 |
| 7,442,930 B2 * | 10/2008 | Chou | .................. | G01N 23/203 250/311 |
| 7,978,821 B1 * | 7/2011 | Glavicic | .............. | G01N 23/203 378/76 |
| 8,253,099 B2 * | 8/2012 | Nicolopoulos | ......... | H01J 37/05 250/311 |
| 8,664,598 B2 * | 3/2014 | Hasuda | .................. | H01J 37/244 250/310 |
| 8,809,783 B2 * | 8/2014 | Wu | .......................... | H01J 37/28 250/305 |
| 9,383,325 B2 * | 7/2016 | Li | .......................... | G01N 23/203 |
| 9,535,020 B2 * | 1/2017 | Schillinger | ......... | G01N 23/2254 |
| 9,568,442 B2 * | 2/2017 | Taheri | .................... | G01N 23/04 |
| 9,618,463 B2 * | 4/2017 | Unčovský | .............. | H01J 37/252 |
| 9,640,365 B2 * | 5/2017 | Han | ........................ | H01J 37/244 |
| 9,671,354 B2 * | 6/2017 | Penman | .............. | G01N 23/203 |
| 9,922,798 B2 * | 3/2018 | Shidara | .............. | H01J 37/3056 |
| 9,978,557 B2 * | 5/2018 | Flanagan, IV | ........ | H01J 37/261 |
| 10,062,145 B2 * | 8/2018 | Langlois | .................. | G06T 7/174 |
| 10,126,256 B2 * | 11/2018 | Schwager | .......... | G01N 23/2252 |
| 10,234,282 B2 * | 3/2019 | Winkelmann | ........ | G01N 23/203 |
| 10,319,560 B2 * | 6/2019 | Pavia | .................. | G01N 23/2251 |
| 10,468,229 B2 * | 11/2019 | Pavia | .................. | G02B 21/0016 |
| 10,641,719 B2 * | 5/2020 | Jung | .................. | G01N 23/2251 |
| 10,663,414 B2 * | 5/2020 | Bauer | .................... | H01J 37/252 |
| 10,784,076 B2 * | 9/2020 | Vystavěl | ............. | H01J 37/2955 |
| 10,811,217 B2 * | 10/2020 | Amino | .................. | H01J 37/222 |
| 10,811,218 B2 * | 10/2020 | Mori | .................. | G01N 23/20058 |
| 10,935,505 B2 * | 3/2021 | Otsuka | .............. | G01N 23/2055 |
| 11,114,275 B2 * | 9/2021 | Stejskal | .............. | H01J 37/2955 |
| 11,139,137 B2 * | 10/2021 | Swan | .................. | G01N 23/2251 |
| 11,270,867 B2 * | 3/2022 | Schwager | ............... | H01J 37/20 |
| 11,383,324 B2 * | 7/2022 | Lee | .......................... | B23K 31/12 |
| 11,526,980 B2 * | 12/2022 | Latourte | ............ | G01N 23/2251 |

OTHER PUBLICATIONS

Nolze et al., "Pattern matching approach to pseudosymmetry problems in electron backscatter diffraction", Untramicroscopy, vol. 160, pp. 146-154, Oct. 23, 2015.
Schwartz et al., "Electron Backscatter Diffraction in Material Science", Text Book, Springer Science, pp. 1-352, 2000, New York.
Schwarzer, et al. "Present State of Electron Backscatter Diffraction and Prospective Developments", Lawrence Livermore National Laboratory, pp. 1-36, Oct. 24, 2008.
Wright et al.,"Introduction and comparison of new EBSD post-processing methodologies", vol. 159, pp. 81-94, Aug. 17, 2015.
Zhang et al., "New indicators from bedding-parallel beef veins for the fault valve mechanism", Science China Earth Sciences, vol. 58, No. 8, pp. 1320-1336, May 21, 2015.
International Search Report dated Jul. 23, 2020, issued in connection with PCT International Application No. PCT/EP2020/062373.
Written Opinion issued in connection with PCT International Application No. PCT/EP2020/062373.

* cited by examiner

FIG. 1

64: TKD detector
65: Phosphor screen
67: ESD detector
70: Control unit

METHOD FOR IMPROVING AN EBSD/TKD MAP

This application is the U.S. National Stage of International Application No. PCT/EP2020/062373, filed May 5, 2020, which claims foreign priority benefit under 35 U.S.C. § 119 of European Patent Application No. 19173309.6, filed May 8, 2019, the disclosures of which are incorporated herein by reference.

The present invention refers to a method for improving the quality of a phase and crystal orientation map obtained using Electron BackScatter Diffraction or Transmission Kikuchi Diffraction technique, particularly to a post-acquisition method for improving the quality of phase and crystal orientation map comprising a plurality of data points, wherein each data point is assigned to a corresponding grid point of a sample surface grid and representing crystal information extracted from a Kikuchi pattern detected from each individual grid point on the sample. The present invention further relates to a method for determining a sample structure, particularly to a method for determining a sample structure data using an electron diffraction (Kikuchi diffraction) technique with improved refinement of acquired sample structure data of a sample grid, and to a measurement system therefore.

TECHNOLOGICAL BACKGROUND AND PRIOR ART

Energy dispersive spectroscopy (EDS, also called EDX) is the probably most commonly used X-ray analytic technique for characterizing the elemental composition of a sample based on characteristic X-rays emitted by the sample after being excited by an incident electron beam. EDS measurements are commonly carried out within electron microscopes (EM), such as e.g., scanning electron microscopes (SEM), which comprise suitably configured EDS detectors inside a measurement chamber of the electron microscope. In the EM, the EDS detectors are often arranged upstream of the sample in the propagation direction of the electron beam.

Another analytic technique for measuring crystal orientation that can be integrated into an electron microscope is Kikuchi diffraction. This technique can be implemented as electron backscatter diffraction (EBSD), which is also known as backscatter Kikuchi diffraction (BKD), or as transmission Kikuchi diffraction (TKD), also known as transmission electron backscatter diffraction (t-EBSD). In EBSD, backscatter electrons are detected upstream the sample with respect to a propagation direction of an initially incident electron beam, whereas in TKD transmitted and diffracted electrons are detected downstream the sample in this direction. Both implementations can be theoretically applied to any crystalline material and provide the absolute crystal orientation with sub-micron spatial resolution and phase information.

In general, Kikuchi diffraction can be utilized to provide information on the phase of a sample-region of a crystalline material, particularly on the crystal structure, such as e.g., body-centered or face-centered cubic, orthorhombic or the like, and the spatial orientation of this crystal structure. Kikuchi diffraction can also reveal information on the strain in a material. In Kikuchi diffraction backscattered or transmitted electrons are diffracted by the periodic atomic lattice within the sample according to the Bragg condition before they exit the sample.

Figure 1:
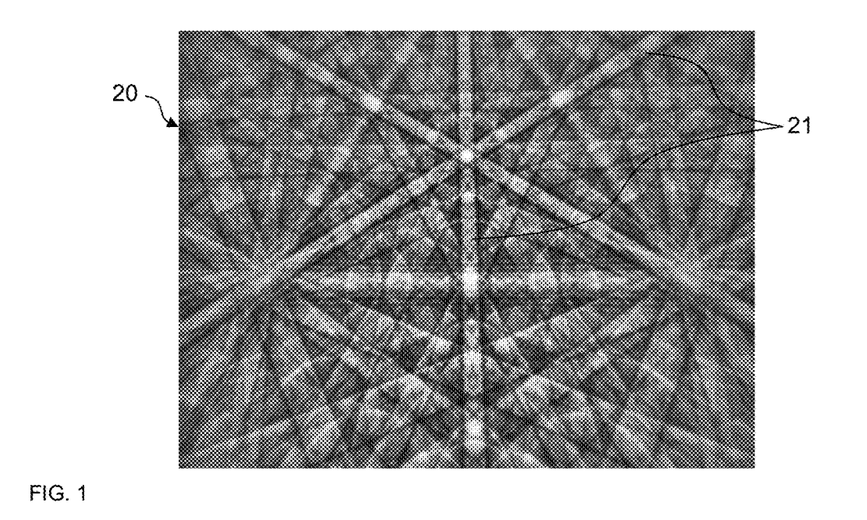
FIG. 1 illustrates a Kikuchi pattern that can be obtained via EBSD.

At least part of the scattered electrons thus exit the sample with an angle-dependent intensity distribution. If this intensity distribution is detected using a two-dimensional detector, a so-called Kikuchi pattern as illustrated in FIG. 1 is recorded as a gnomonic projection on the detector surface. The backscattering of the incident electrons takes place within a limited region near the incident electron beam position, wherein the position of this region with respect to the detector surface is the so-called pattern center (PC). A typical feature of such Kikuchi patterns is the narrow Kikuchi bands with an angular width of two times the Bragg angle of the corresponding diffracting crystal planes. These bands result can be considered to be formed by the Kossel cone of the respective crystal plane intersecting with the detector. With an appropriate experimental setup, the Kikuchi bands extend linearly on the detector.

If the geometry of the experimental setup is well described, the Kikuchi bands can be related to the underlying crystal phase and orientation of the material within the source region. Each band present in an indexed Kikuchi pattern, i.e. crystal phase and orientation are known, can be indexed individually using the Miller indices. Theoretically, a minimum of three bands is necessary to determine the crystal orientation and phase represented by a given Kikuchi pattern. In practice more than three bands are required to unambiguously index a pattern. The minimum number of bands is decided by the user based on the number of crystal phases present (in the scanned area) and their symmetry, i.e. the higher the crystal symmetry and the larger the number of phases the higher the number of bands required for correctly index a specific pattern.

By scanning the sample with an electron beam and obtaining a Kikuchi pattern for each point of such scanned sample grid, an EBSD/TKD map can be obtained by analysing each individual pattern. Therein, each data point of the EBSD/TKD map corresponds to one point of the sample grid, wherein crystal phase and orientation information is assigned for each data point of the map. The EBSD/TKD map allows visualizing the variation of crystal orientation and/or phase within the sample e.g. by using conventional coloring schemes for coloring each data point in the map.

However, due to various factors an erroneous solution for crystal orientation and/or phase or no solution at all might be determined for a data point of the EBSD/TKD map (i.e., a point of the sample grid). Such defective data points with zero solutions (ZS) or misindexed data points or outliers are often corrected using post-acquisition data processing methods. One common method for correcting the crystal orientation and/or phase data of a defective data point is to attribute it the average crystal orientation of correctly indexed surrounding data points.

When the surrounding data points contain information of more than one crystal orientation, i.e. 7 or less data points have the same orientation information, the largest number of data points with the same orientation will be used (majority wins). These methods can be applied iteratively until all data points that fit the correction criteria have been modified. However, these methods can often lead to creation of artefacts in the EBSD/TKD maps when applied extensively on high noise raw maps and provide an erroneous representation of the internal crystal structure of the sample. The creation of such artefacts in the EBSD/TKD maps is enabled by the relaxed rules existing in commercial EBSD software for setting up the data point correction criteria and is most of the time connected to entry level users.

BREWICK PATRICK T ET AL: "NLPAR: Non-local smoothing for enhanced EBSD pattern indexing", ULTRA- MICROSCOPY, vol. 200, 19 Feb. 2019 (2019-02-19), pages 50-61, XP085668873, ISSN: 0304-3991, DOI: 10.1016/J.ULTRAMIC.2019.02.013 discloses a post-processing technique for pattern enhancement that aids in re-indexing by leveraging a non-local smoothing kernel whose weights are based on the exponential decay of the Euclidean distance between patterns. WRIGHT STUART I ET AL: "Introduction and comparison of new EBSD post-processing methodologies", ULTRAMICROSCOPY, vol. 159, 17 Aug. 2015 (2015-08-17), pages 81-94, XP029338918, ISSN: 0304-3991, DOI: 10.1016/J.ULTRAMIC.2015.08.001 discloses post-processing methods for improving EBSD scan data by correlating non-indexed or misindexed points with the orientations obtained at neighboring points in the scan grid as well as a re-scanning approach using local pattern averaging and the use of the multiple solutions obtained by the triplet indexing method. The known methods have the disadvantage that they are not particularly suited for grain boundaries where the might lead to incorrect results.

It is thus an object of the invention to overcome or reduce at least some of the disadvantages of the prior art and to provide a method for improving the quality of an EBSD/TKD map with an advanced post-acquisition data processing for correcting defective data points of that EBDS/TKD map.

DESCRIPTION OF THE INVENTION

The objective of the invention is solved and the disadvantages of the prior art are overcome, at least partially, by the methods disclosed herein as well as by the measurement system disclosed herein.

An aspect of the invention relates to a method for improving an EBSD/TKD map. As already set forth above, the EBSD/TKD map comprises a plurality of data points, i.e., discrete and two-dimensional spatial regions with a set extension in a first direction, e.g., an x-direction, and a set extension in a second direction, e.g., a y-direction. Each of those data points is assigned to a corresponding grid point of a sample grid, i.e., to a point of a sample that was irradiated with an electron beam during a scanning of the sample, e.g., in a scanning electron microscope. Each of the data points is further representing (or assigned to) crystal information, such as e.g., crystal structure and orientation. Therein, for each data point this crystal information has been determined based on a Kikuchi pattern that was detected for the corresponding grid point. Methods, apparatus and techniques for initially acquiring of crystal information for a sample using detected Kikuchi patterns is well known to the skilled person.

In the method for improving such EBSD/TKD map according to the present invention a defective data point of the EBSD/TKD map is determined. The method is preferably applied for multiple defective data points, most preferred for all defective data points, of the EBSD/TKD map. However, without being restricted thereto, in the following the method of the invention is described for one defective data point. Further, a plurality of non-defective data point of the defective data points is determined. In other words, the prerequisites for applying the method of the invention is an EBSD/TKD map with at least one defective data point that comprises at least two neighboring non-defective data points, those two data points preferably having the same crystal orientation and phase information. Therein, most general a defective data point is a data point that requires post-acquisition data processing, i.e., a data point that is assigned to erroneous crystal information, whereas a non-defective data point is a data point that is assigned with crystal information with sufficient confidence.

In another step of the method of the invention, Kikuchi bands of a Kikuchi pattern that has been detected for a grid point which is corresponding to the defective data point are utilized again for improving the crystal information assigned to the defective data point. As set forth above, this information has been used before in a standard process to determine the crystal information now assigned to the defective data point. However, in the method of the invention these Kikuchi bands are compared to simulated Kikuchi patterns corresponding to crystal information of the neighboring data points. Therein, the simulated Kikuchi pattern is that pattern that gave a best fit in an initial determination of crystal information for the neighboring data point, i.e., for a detected Kikuchi pattern of the corresponding grid point of the neighboring data point. The comparison is carried out automatically and preferably in broad agreement with standard methods for Kikuchi diffraction, e.g. using Hough transform.

In the method of the present invention, the defective data point is then assigned the crystal information of one of the plurality of neighboring data points based on the comparison. In other words, when the position of Kikuchi bands detected in the pattern corresponding to the defective data point are compared to the positions of Kikuchi bands in the simulated Kikuchi patterns corresponding to at least one neighboring data point (each neighboring data point is assigned exactly one simulated Kikuchi pattern due to the crystal information assigned to the neighboring data point and different neighboring data points might be assigned to different crystal information/simulated Kikuchi patterns), the simulated Kikuchi pattern providing the best fit/match with the Kikuchi bands is determined. This best fitting/matching simulated Kikuchi pattern is unambiguously related to crystal information which is then assigned to the (formerly) defective data point. After this assignment the data point is no longer defective and the quality of the EBSD/TKD map has been improved.

The method of the present invention advantageously allows for improving an EBSD/TKD map by selectively replacing the crystal phase and orientation information of a defective data point with the crystal phase and orientation information of a neighboring data point in a qualitative manner. Therein, in contrast to known methods, the replacement is not only based on a mere averaging of the crystal information/solutions of the neighboring data points. Rather the data initially detected, e.g. band positions in the Kikuchi pattern, for the defective data point is used again for performing a matching to at least one of the simulated Kikuchi patterns assigned/corresponding to each of the neighboring data points. In other words, the method of the invention is comparing experimental data (band positions) from the defective data point with data contained by its neighbouring data points and thus significantly reduces the chances for erroneous attribution of crystal information to the defective processed data points, e.g. by an inexperienced user.

For instance, if the defective data point contained a very high noise Kikuchi pattern where less than three Kikuchi bands can be detected the method of the current invention will leave the data point information unchanged while the prior art methods may attribute it a solution based on the number of neighboring non-defective data points. In other words, the prior art map correction methods may attribute solutions to data points acquired even from amorphous areas of the sample thus creating microstructural artefacts. The method proposed by the current invention will not make such an error as there will be no Kikuchi bands in the experimental pattern to match with the positions of bands in the simulated solutions of the neighboring data points. Furthermore, the method proposed by the current invention will only be applied to data points containing patterns on which at least three Kikuchi bands can be detected thus guaranteeing that only data points from crystalline or semi-crystalline regions of the scanned area may be corrected.

In the method of the invention, the defective data point is assigned with the crystal phase and orientation information of that neighboring data point, which is associated with a simulated Kikuchi pattern that is matching the Kikuchi pattern detected for the defective data point, preferably at least three Kikuchi bands in this Kikuchi pattern. Usually, the comparison of the Kikuchi bands of the defective data point will yield one best match with one simulated Kikuchi pattern of one of the neighboring data points. Then, that crystal phase and orientation information associated with this one simulated Kikuchi pattern is assigned to the defective data point.

In a particularly preferred embodiment of the method of the invention, at least one first neighboring data point is assigned with first crystal phase and orientation information corresponding to a first simulated Kikuchi pattern and at least one second neighboring data point is assigned with second crystal phase and orientation information corresponding to a second simulated Kikuchi pattern. Usually more than one first neighboring data point is assigned with the first crystal phase and orientation information and more than one second neighboring data point is assigned with the second crystal and orientation phase information.

Defective data points/grid points often occur at grain boundaries, domain boundaries or the like, porosities, etc. Due to the decreased crystallinity, in such region an initial assignment of crystal information is prone to fail, as common band detection algorithms usually work nonbiased and, exemplarily, try to match all of the most "visible" bands. However, in such boundary region, these bands originate most likely from two different crystal phases. Hence, as a subsequent indexing of the identified bands is successful, only when a single crystal phase is found that matches the identified bands, for grid points of such regions often no unambiguous crystal information is found.

Hence, the method of this particularly preferred embodiment thus comprises the steps of comparing the Kikuchi bands of the Kikuchi pattern detected for the grid point corresponding to the defective data point with the first simulated Kikuchi pattern and of comparing the Kikuchi bands of the Kikuchi pattern detected for the grid point corresponding to the defective data point with the second simulated Kikuchi pattern. Then, one of the first and second simulated Kikuchi pattern is determined that has the best match with the Kikuchi bands of the Kikuchi pattern detected for the grid point corresponding to the defective data point. The crystal phase and orientation information of that determined one of the first and second simulated Kikuchi pattern is then assigned to the defective data point. In other words, in the method of the invention improved crystal phase and orientation information for the defective data point is exclusively determined based on the already found solutions of neighboring non-defective data points and how the position of some of the Kikuchi bands in these neighboring data points match the position of the detected bands in the pattern corresponding to the defective data point. Hence, with low computational effort the crystal phase and orientation information for the defective data point is determined. This new method of correcting the crystal phase and orientation of a defective data point is by design user experience independent and thus produces more realistic EBSD/TKD maps as compared to corrected maps produced by prior art methods.

In a preferred embodiment of the invention, a first matching threshold was (or is) used in comparing a detected Kikuchi pattern of a grid point to the simulated Kikuchi pattern corresponding to the crystal information, i.e., crystal phase and orientation information, represented by the corresponding data point (process known as indexing). Although this actually refers to a preceding method for determining an initial set of crystal phase and orientation information for the data points of an EBSD/TKD map based on the Kikuchi patterns detected for the grid points of a sample, this first matching threshold might be still associated (and stored) for the data points or might be generally stored in a software of such initial method, i.e., available.

In the method of the present invention for improving the EBSD/TKD map, a second matching threshold is then used in the step of comparing the Kikuchi bands of the Kikuchi pattern detected for the grid point corresponding to the defective data point with the simulated Kikuchi patterns corresponding to crystal information of the neighboring data points. According to this preferred embodiment, the second matching threshold is below the first matching threshold. In other words, a crystal phase and orientation information might be assigned to the defective data point, even if a matching quality is below a matching quality required in the initial method. However, the assumption is mostly valid that the defective data point will be attributed the crystal phase and orientation information of one or few of the neighboring data points, preferably if at least three detected bands in the pattern of the defective data point match with some of the bands in the simulation(s) of the non-defective neighboring data point(s).

However, there might be cases wherein the comparison of the Kikuchi bands of the Kikuchi pattern detected for the grid point with the first and second simulated Kikuchi pattern meets the second matching threshold. In other words, a fit between the experimental data of the defective data point and two different crystal information of neighboring data points is found. In such a situation of a tie, additional matching parameters are preferably used for determining the best match of the simulated Kikuchi patterns with the detected (identified) Kikuchi bands. Preferably the additional matching parameters comprise information of most characteristic/intense bands of the simulated patterns the matching of which is weighted more than the matching of less significant bands, even if the less significant bands outnumber the characteristic ones.

In the method of the present invention, different approaches might be used for identifying a defective data point among the data points of the initially obtained EBSD/TKD map. Preferably, it is distinguished between data points of zero solution, misindexed data points with low matching quality and outliers having an acceptable initial match but differ significantly from the neighboring data points. Hence, in a first preferred embodiment, the defective data point is determined as data point representing (or being assigned/associated with) void crystal information. In other words, no valid crystal information is assigned with this data point due to a non successful performance of the initial assignment method. Exemplarily, a successful outcome of the initial indexing might require that at least N identified bands are successfully matched to the simulated Kikuchi pattern. Hence, if less than N bands are matched, the initial indexing has failed to find an acceptable solution and the data point is not assigned a crystal information, i.e. zero solution, but will be assigned the position of all detected bands in the experimental Kikuchi pattern. This Kikuchi band position information will be used during the post processing correction method proposed by the current invention.

In a further preferred embodiment of the present invention, each one data point of the EBSD/TKD map is assigned a matching parameter that characterises a match between the Kikuchi pattern detected for one grid point corresponding to the respective one data point and the simulated Kikuchi pattern that corresponds to the crystal information of the one data point. In other words, the data points of the EBSD/TKD map comprise not only the crystal information but additional information on the grade (quality) of the matching of the crystal information and the position of Kikuchi bands in the experimental Kikuchi pattern. In such embodiment, the defective data point is preferably determined based on the matching parameter, particularly preferred if the matching parameter is below a predetermined threshold.

Preferably, the quality of an indexing, i.e., of matching identified bands with simulated Kikuchi patterns, is defined by a number N of detected bands that have been fitted (matched) to the simulated Kikuchi pattern. In other words, how many detected bands (N), out of a total amount of X detected bands, fit bands in the simulated Kikuchi pattern that was found as the best solution to the experimental Kikuchi pattern. Further preferred, the quality of an indexing, i.e., of matching identified bands with simulated Kikuchi patterns is defined by a band mismatch (BMM) value that might be defined as an angular mismatch between the detected Kikuchi bands and their corresponding bands in the simulated Kikuchi pattern. Also preferred, the BMM value refers to a (normalized) average value of such angular mismatch for a plurality of Kikuchi bands, e.g. for the Kikuchi bands with the most intensity. In the method of the invention, the aforementioned parameters defining the quality of indexing preferably used as the matching threshold of the initial assignment and/or the method of improving the EBSD/TKD map and/or as the matching parameter characterizing the quality of the matching.

According to a further preferred embodiment, a defective data point is determined as a data point for which a number of neighboring data points with different assigned crystal information exceeds a predetermined threshold. In other words, each one data point having at least M neighboring data points that have crystal information that differ from the crystal information of that one data point is preferably defined as a defective data point. Particularly preferred in such embodiment, a first threshold M1 is defined as a number for neighboring data points having different crystal information than the presumed defective data point. Further, a second threshold M2 is defined as a number for neighboring data points with different crystal information than other neighboring data points. In other words, the second number defines the amount of different sets (grains/domains) of neighboring data points having the same crystal information different from the crystal information than the presumed defective data point. In such embodiment, threshold M1 might be sufficient for defining a defective data point. Threshold M2 might be used to determine whether the method of the invention is applied. Exemplarily, if M2 equals eight a known method for merely using the crystal information of all neighboring data points for the defective data point might be sufficient.

Another preferred embodiment of the present invention relates to a method also comprising the step of obtaining an EBSD/TKD map in addition to the steps of improving the EBSD/TKD map in the method of the invention as described above. The preferred method comprises the step of obtaining an EBSD/TKD map with a plurality of data points, wherein to each data point is assigned crystal information for a corresponding point of a sample grid, the step of determining a defective data point of the EBSD/TKD map and a plurality of non-defective neighboring data points of the defective data point, the step of comparing Kikuchi bands of a Kikuchi pattern acquired for a grid point corresponding to the defective data point with simulated Kikuchi patterns corresponding to crystal information of the neighboring data points and the step of assigning the defective data point the crystal information of one of the plurality of neighboring data points based on the comparison, i.e., of the best matching simulated Kikuchi pattern associated with the crystal information of the respective neighboring data point.

In a further preferred embodiment of the invention, the EBSD/TKD map is determined by performing, for each point of the sample grid of a sample, the steps as described in the following. First, irradiation of the sample with an electron beam is carried out, wherein the electron beam is targeted to sample grid points of a sample grid extending over the sample. The sample grid is equal to a scanning grid known from SEM imaging. For each sample grid point, then diffracted electrons that are exiting the sample are detected with an EBSD/TKD detector, wherein part of the exiting electrons form a Kikuchi pattern on the detector active surface, e.g. scintillator screen. In other words, conventional EBSD or TKD mapping is performed by placing an electron beam on a grid of points and acquire a Kikuchi pattern from each point while simultaneously transfer already acquired patterns to a control unit for automated analysis.

In a next step a plurality of Kikuchi bands are identified in the detected Kikuchi pattern. Therein, band identification (band detection) is preferably carried out by using a combination of mathematical transformations and image processing. Particularly preferred, a Hough and/or Radon transform is applied to the detected Kikuchi pattern and the Kikuchi bands' positions are described by the coordinates of corresponding peaks in the resulting Hough and/or Radon image. The result of the band detection is, for each band, a position of the band within the Kikuchi pattern. The position is preferably defined by two parameters per band, wherein a first parameter defines an inclination value and a second parameter defines distance to a set reference point.

In a next step, the (positions of) identified Kikuchi bands of the detected Kikuchi pattern are compared with (positions of) Kikuchi bands of a plurality of simulated Kikuchi patterns. In other words, the so-called indexing of the Kikuchi bands is carried out. Preferably, this step comprises to a comparison of the angles between the identified Kikuchi bands of a detected Kikuchi pattern with the angles formed by the most intense Kikuchi bands in a simulated Kikuchi pattern. Therein, the plurality of simulated Kikuchi patterns is preferably generated for a plurality of candidate crystal phases that are defined by a user or automatically. This process leads, at least for part of the data points, to a resulting match, i.e. to that an unambiguous simulated Kikuchi pattern is determined that fits the identified Kikuchi bands of the detected Kikuchi pattern. In theory, finding an unambiguous solution in the indexing process requires a minimum of three detected Kikuchi bands that intersect each other, i.e. form a triangle. However, due to various factors in practice a solution is often found to be correct only if at least five or more Kikuchi bands are matched.

In the method of the invention, then a matching simulated Kikuchi pattern is determined based on the comparison, i.e., a simulated Kikuchi pattern comprising the bands that fit the detected bands. Further, if a matching simulated Kikuchi pattern is determined, so is crystal information, e.g. crystal phase structure and orientation. Hence, in the method of the invention also crystal information corresponding to the matching simulated Kikuchi pattern is determined and is assigned to a data point of the EBSD/TKD map corresponding to the grid point.

With respect to the steps of the method for determining a sample structure that are known from the prior art it is referred to the following documents that give an overview over the state of the art with respect to the generation of EBSD/TKD maps in EBSD or TKD analysis. It is particularly referred to the text book "Electron Backscatter Diffraction in Material Science" by Schwartz A. J. et al, Springer Science, 2000, New York. It is further referred to the review publication of Schwarzer R. A. et al. "Present State of Electron Backscatter Diffraction and Prospective Developments", Oct. 24, 2008, Lawrence Livermore National Laboratory. Insofar admissible the content of these publications is incorporated herein with respect to the steps of the methods described above, where these steps are known from the prior art. The content is incorporated herein by reference for the sake of sufficiency of disclosure with respect to the steps of the methods of the invention that are already known from the prior art.

Another aspect of the present invention refers to a measurement system comprising an electron microscope, EM, preferably a scanning electron microscope, SEM, an EBDS detector and/or a TKD detector, and a control unit that is configured to perform the method for determining a sample structure according to the invention as described above. Further preferred, the control unit is configured to perform the method for improving an EBSD/TKD map according to the invention as described above. The electron microscope preferably further comprises an EDS detector and is further configured for (scanning) electron microscopy/imaging. Further preferred, the EBSD detector is configured to perform EBSD measurements under control of the control unit and/or the TKD detector is configured to perform TKD measurements under control of the control unit. Particularly preferred, the control unit that is further configured to control an electron source, the EBSD detector, the TKD detector and/or the ESD detector.

Further preferred the (S)EM is configured to perform EBSD and/or TKD measurements in the same configuration as used for with EDS measurements and/or as used for obtaining images with an imaging detector. Further preferred, the imaging detector is an in-column imaging detector that might be arranged inside a pole piece of an electron lens and/or between electron lenses of the column. In-column imaging detectors use secondary electrons (SE) and therefore may be named in-column SE detectors. Preferably, the EBSD and/or TKD detector comprises at least an active surface, e.g. phosphor screen for converting incident electrons to photons and a CCD or CMOS camera for obtaining image signals from these photons. Further preferred, the EBSD and/or TKD detector comprises a cooling system and is configured for operating at room temperature for reducing the dark current of the CCD/CMOS camera. Further preferred, the TKD detector is a Bruker e-Flash EBSD detector retrofitted for optimal measurement geometry with a Bruker Optimus TKD measuring head and the EBSD detector is a Bruker e-Flash EBSD detector.

Another aspect of the invention relates to a computer program comprising instructions which, when the program is executed by a computer, e.g. a control unit of the measurement system of the invention, cause the computer, and eventually the measurement system, to carry out the method of the invention, comprising the steps of: determining a defective data point of the EBSD/TKD map and a plurality of non-defective neighboring data points of the defective data point, comparing Kikuchi bands of a Kikuchi pattern detected for a grid point corresponding to the defective data point with simulated Kikuchi patterns corresponding to crystal information of the neighboring data points and assigning the defective data point the crystal information of one of the plurality of neighboring data points based on the comparison.

Another aspect of the invention relates to a computer-readable medium comprising instructions which, when executed by a computer, e.g. a control unit of the measurement system of the invention, cause the computer, and eventually the measurement system, to carry out the method of the invention, comprising the steps of: determining a defective data point of the EBSD/TKD map and a plurality of non-defective neighboring data points of the defective data point, comparing Kikuchi bands of a Kikuchi pattern detected for a grid point corresponding to the defective data point with simulated Kikuchi patterns corresponding to crystal information of the neighboring data points and assigning the defective data point the crystal information of one of the plurality of neighboring data points based on the comparison.

Further aspects and preferred embodiments of the present invention disclosed herein are set forth in the drawings and the following description of the drawings. Different disclosed embodiments are advantageously combined with each other if not stated otherwise.

DESCRIPTION OF THE DRAWINGS

The features of the invention become apparent to those skilled in the art by the detailed description of exemplary embodiments with reference to the attached drawings in which.

DETAILED DESCRIPTION OF THE INVENTION

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art.

Accordingly, processes, elements, and techniques that are not considered necessary to those having ordinary skill in the art for a complete understanding of the aspects and features of the present invention may not be described.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention. Expressions such as "at least one of," when preceding a list of elements, modify the entire list of elements and do not modify the individual elements of the list.

As used herein, the term "substantially", "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

FIG. 1 shows an experimentally obtained (detected) Kikuchi pattern 20 for a gallium phosphide sample in a scanning electron microscope. Clearly visible are the Kikuchi bands 21 having an angular width that corresponds to two times the Bragg angle of the corresponding crystal plane of the crystal lattice reflecting the electrons for producing that Kikuchi bands 21. The Kikuchi pattern 20 can be obtained via EBSD or TKD. A detection of such experimental Kikuchi pattern 20 using TKD is described in the following with respect to FIG. 2.

Figure 2:
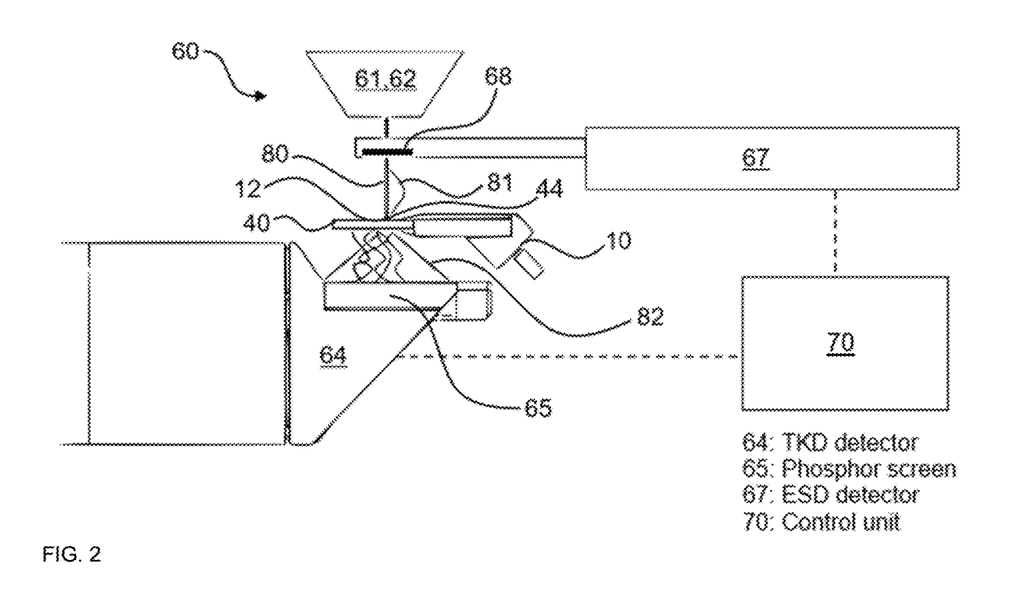
FIG. 2 is a combined EDS and TKD measurement system according to an example.

FIG. 2 illustrates a combined EDS and TKD measurement system mounted to an electron microscope 60 according to an example of the present invention. According to FIG. 2 an electron microscope, EM, 60, i.e., a scanning electron microscope (SEM), is configured to perform transmission Kikuchi diffraction (TKD) measurements. A pole piece 62 (magnetic pole), which is part of an electron lens 61 of the EM 60, is arranged at a column of the EM 60. Moreover the EM 60 comprises a sample holder 10 and a TKD detector 64, which comprises a phosphor screen 65. Moreover the EM 60 comprises an EDS (energy dispersive X-ray spectroscopy) detector 67. The EM 60 is configured to perform EDS measurements with the EDS detector 67 and to perform TKD measurements with the TKD detector 64. A sample 12, the column comprising the electron lens 61 with the pole piece 62, the TKD detector 64 and the EDS detector 67 are arranged in a way, such that TKD measurements and EDS measurements can be made without changing the position of a sample holder 10.

The electron microscope 60, particularly the scanning electron microscope 60, comprises a sample holder 10 positioned between the EDS detector 67 and the TKD detector 64 such that a sample 12 loaded to the sample holder 10 is positioned between an active area 68 of the EDS detector 67 and a phosphor screen 65 of the TKD detector 64. Particularly, the sample 12 is positioned between the EDS detector 67 and the TKD detector 64 with respect to the propagation direction of an electron beam 80 emitted by the electron microscope 60, particularly from a pole piece 62 of the EM 60, and focussed by electron lens 61.

The sample 12 is prepared electron transparent such that at least part of the incident electron beam 80 is transmitted through the sample 12 and positioned such that the primary electron beam 80 is incident on the sample 12. Depending mostly on the sample thickness, material make-up and incident electron energy, the incident primary electrons are traversing the sample 12 and hence diffracted electrons 82 exit the sample 12 via an exit surface thereof facing the phosphor screen 65 of the TKD detector 64. These transmitted and diffracted electrons 82 allow for detecting Kikuchi patterns of the sample 12 via the TKD detector 64. The incident primary electron beam 80 also effects the generation of characteristic X-rays of the sample 12. The characteristic X-rays exiting the sample 12 via a top surface propagate towards the active area 68 of EDS detector 67, thus allowing to obtain EDS spectra from the sample 12 and to perform an element composition analysis on the sample 12.

The configuration of sample 12 and detectors 64, 67 as illustrated in FIG. 2 advantageously enables simultaneous acquisition of Kikuchi patterns and EDS spectra at speeds, which can be at least one order of magnitude faster than with conventional detectors, using the same electron beam parameters. The main factor limiting the acquisition speed in combined TKD/EDS measurements is the reduced X-Ray signal resulting from the interaction of the incident electron beam 80 with the electron transparent sample 12 within a very small interaction volume. By using the EDS detector 67 that is positioned underneath the pole piece 62 and right above the electron transparent sample 12 it is advantageously possible to increase the X-ray capturing solid angle by up to two orders of magnitude and hence to increase the X-ray input count rate in a corresponding manner. The much higher X-Ray input/output count rate enables fast measurements without affecting the signal to noise ratio in the EDS spectra.

However, the transmitted and diffracted electrons 82 exiting the sample 12 towards the TKD detector 64 will inevitably hit the phosphor screen 65 of the TKD detector 64, where they can effect the generation of characteristic X-rays 81 of the phosphor screen 65. This characteristic X-rays 81 can also propagate upwards towards sample 12 and, if they bypass the sample 12, can reach the active area 68 of the EDS detector 67 as stray X-rays. These stray X-rays are deleterious to the measurement in two ways: first they are producing "stray" peaks in the EDS spectrum which can interfere with the processing/quantification process and, second, they significantly increase the input count rate and therefore could limit the output count rate of the EDS detector 67 thus reducing the amount of useful counts originating from the sample 12 with a direct influence on the SNR or quality of the EDS spectrum.

However, the sample holder 10 illustrated in FIG. 2 comprises a specially designed aperture extension 40 that is fixed to the sample holder 10 and that is made of the same material as the sample holder 10 in order to avoid the production of additional peaks that could show up in any EDS spectrum. Further, the aperture extension 40 blocks stray X-rays originating from the phosphor screen 65. Hence, stray X-rays propagating upwards from the phosphor screen 65 are blocked by the aperture extension 40 extending laterally over the sample 12. However, the aperture extension 40 features an aperture opening 44 that is positioned right above the electron transparent sample 12, and thus any characteristic X-rays 81 generated by the sample 12 itself, can still reach the active area 68 of the EDS detector 67.

Using the measurement system of the invention as illustrated in FIG. 2 for obtaining a Kikuchi pattern 20 as illustrated in FIG. 1, an EBSD/TKD map can be obtained that is a representation of a sample (surface), wherein each data point of the EBSD/TKD map corresponds to a sample grid point of a sample grid superimposed with the sample 12, wherein an experimental Kikuchi pattern 20 was detected for each of the sample grid points. Based on an initial analysis of the Kikuchi patterns 20 as described above, crystal information was determined for each of the data points of the EBSD/TKD map. However, depending on various factors, such as e.g., the spatial resolution of the sample grid, some of the data points might be defective.

Figure 3:
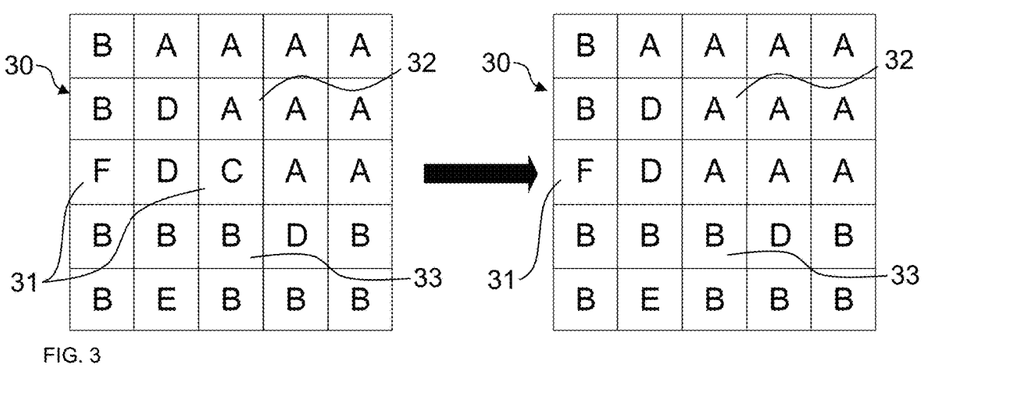
FIG. 3 schematically illustrates an EBSD/TKD map with a plurality of data points and crystal information of grid points of the sample grid assigned to the data points and a post-acquisition data processing method according to the prior art.
Figure 4:
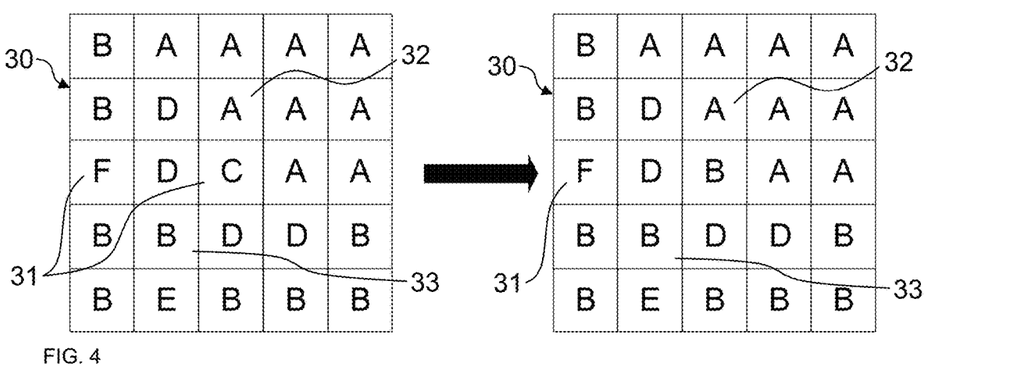
FIG. 4 schematically illustrates an EBSD/TKD map with a plurality of data points and crystal information of grid points of the sample grid assigned to the data points and a post-acquisition data processing method according to an embodiment.
Figure 5:
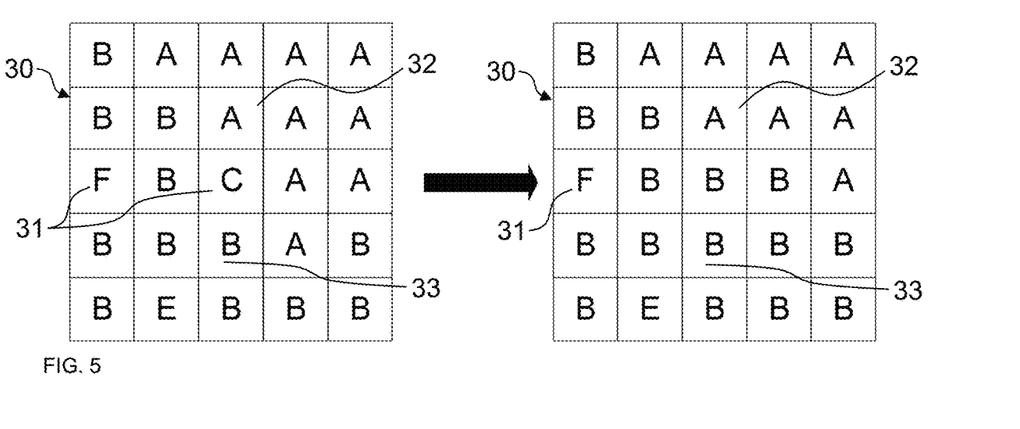
FIG. 5 schematically illustrates an EBSD/TKD map with a plurality of data points and crystal information of grid points of the sample grid assigned to the data points and a post-acquisition data processing method according to an embodiment.

Possible outputs of such an initial analysis, i.e., initially EBSD/TKD maps, are illustrated on the left sides of the FIGS. 3 to 5, respectively. With respect to these FIGS. 3 to 5 embodiments of the method for improving a EBSD/TKD map are described in the following. A control unit 70 connected to the EDS detector 67 and/or the TKD detector 64 (illustrated by dashed lines) and configured to perform the method for improving a EBSD/TKD map according to embodiments is also shown in FIG. 2. Therein, the improved EBSD/TKD maps are illustrated on the right sides of the FIGS. 3 to 5, respectively.

FIG. 3 schematically illustrates an EBSD/TKD map 30 with a plurality of data points 31, 32, 33, wherein each data point corresponds to one point of a sample grid of a sample 12 and wherein crystal information A, B, C is assigned to most of the data points of the EBSD/TKD map 30.

Particularly, in an initial method for determining the EBSD/TKD map 30, crystal information was assigned to a data point, if at least five Kikuchi bands 21 of a Kikuchi pattern 20 detected at the corresponding grid point could be matched to a simulated Kikuchi pattern, wherein the assigned crystal information correspond to this simulated Kikuchi pattern. This indexing process has two possible outcomes, namely that a solution is found, which can however be correct or incorrect, or that no solution or a zero solution (ZS) is found.

In the schematic representation of an EBSD/TKD map 30 of FIG. 3, for the data points comprising "A", "B", or "C" a solution was found, wherein for the data points comprising "D" a ZS was found. Therein, the number of ZS data points "D" depends on user defined values for matching parameters/thresholds such as e.g., a minimum number of matched Kikuchi bands. Generally, the higher such matching parameters/thresholds are set, the higher the number of ZS data points but the higher also the quality of the matching. Also, for some data points like "C" and "D" a solution is found but this solution is based on a low number of matched Kikuchi bands. The lower a fraction of ZS data points and data points "C" and "F", the better the quality of an EBSD/TKD map 30. Hence, a user strives to minimize ZS data points and data points like "C" and "F", while maintaining proper matching parameters/thresholds in order to achieve a high quality EBSD/TKD map 30.

In the prior art, data cleaning is an accepted way for increasing the ratio of data points with a correct solution for set matching parameters/thresholds. According to the prior art, data cleaning (noise reduction) usually consists of merely adding or replacing the solution of a certain data point, e.g. "C", with the average solution of a dominant number of similar neighbor data points. While it might be sufficient to attribute the "B" crystal information to the data points "F" and "E" illustrated in FIG. 3, applying "A" or "B" to data points "C" and "D" without further considerations than the amount of dominant neighboring data points may introduce errors in map 30.

With respect to FIG. 3, a known method of improving EBSD/TKD map 30 based on the number of neighboring data points with a same solution might yield sensible results for data points having at least six to seven neighbours with a same crystal orientation and phase, e.g. "E" & "F". However, with respect to data points like "C" and "D" these methods are prone to user induced errors, particularly if no hard limit is imposed on a minimum number of neighboring data points with a same solution required for allowing the change of crystal information of a data point.

Exemplarily, the data point "C" of FIG. 3 is surrounded by three neighboring data point 32 with crystal information "A" and by two neighboring data point 32 with crystal information "B". For the further three neighboring data points 32 "D", the crystal information is unknown. As illustrated in FIG. 3, applying a known data cleaning method to data point "C" as described leads to that data point "C" is attributed crystal information "A" based on that the three data points with crystal information "A" outnumber the two data points with crystal information "B".

However, in fact data point "C" is likely to be part of any of the two grains/domains "A" and "B". As the known data cleaning method can be applied iteratively, shifts of grain boundaries for more than one data point can be produced, which deteriorates the quality of the EBSD/TKD map 30 by making it non-representative of the real microstructure in the measured sample.

FIGS. 4 and 5 schematically illustrate a method for improving an EBSD/TKD map 30 in a post-acquisition data processing method according to an embodiment of the present invention. In both of the initial EBSD/TKD maps on the left side, data points have been assigned crystal information "A" or "B" where a minimum of N Kikuchi bands 21 of a detected Kikuchi pattern 20 were fitted to bands in simulated Kikuchi patterns corresponding to a given crystallographic phase and with crystal orientations "A" or "B".

Further data points have been assigned crystal orientations "C" or "F" and, to simulate the scenario of a real EBSD/TKD map, these assignments have been considered as containing wrong solutions, even though the number of matched Kikuchi bands for data points "C" and "F" was at least equal with the set threshold N. In FIG. 4, some data points have not been assigned any crystal information and thus are considered as zero solutions (voids) "D".

A first embodiment of the invention is described with respect to FIG. 4. Therein, data point "C" is identified as a defective data point 31 as the matching parameter "amount of matched Kikuchi bands" is lower as the threshold N and as further a number of neighboring data points with differing assigned crystal information "A", "B" exceeds a predetermined threshold. As set forth above, due to that data point "C" is near or on a grain/domain boundary between crystals "A" and "B", it is likely that the experimentally detected Kikuchi pattern 20 acquired at the corresponding grid point contains two overlapping Kikuchi patterns 20 i.e. for "A" and "B".

As set forth above, data point "C" was classified as misindexed data point due to, for instance, insufficient number of matching Kikuchi bands 21 of the detected Kikuchi pattern 20 of the corresponding grid point to correctly solve the multiple possible solutions produced by the high crystal symmetry, e.g. as in a Face Centered Cube (FCC) structure. In other words, N matching Kikuchi bands 21 would have been enough to find the correct solution but due to the overlapping of two Kikuchi patterns 20 at the chosen grid point, i.e. at the boundary between grain/cell "A" and grain/cell "B" the indexing algorithm could not find the correct solution, i.e "A" or "B". According to the present invention, the detected Kikuchi bands 21 in the experimental Kikuchi pattern 20 of the corresponding grid point is compared to the simulated Kikuchi patterns associated with the crystal information "A" and "B". Therein, the matching threshold N is reduced in this comparison. Hence, if (N−1) detected Kikuchi bands 21 are matched with Kikuchi bands in the simulated Kikuchi pattern corresponding to grain/cell "A", then data point "C" will be assigned the crystal Information "A". However, if (N−1) detected Kikuchi bands 21 are matched with Kikuchi bands in the simulated Kikuchi pattern corresponding to grain/cell "B", then data point "C" will be assigned the crystal Information "B". If none of the two conditions are met with threshold (N−1), the user can choose to extend the procedure to threshold of (N−2) using the same logic. This can be iterated further to (N−i=3) bands.

In the example as shown in FIG. 4, the data point "C" is finally attributed the crystal information "B" although the amount of neighboring data points "B" 32 of defective data point "C" 31 is lower than the amount of neighboring data points "A" 32 of defective data point "C" 31. In the example as shown in FIG. 5, the amount of neighboring data points 32 with crystal "A" of defective data point 31 is identical to the amount of neighboring data points 32 with crystal "B". Hence, a known solution based on applying the dominant neighboring crystal would not yield a sensible result. However, in the method of the invention, comparison of the experimentally detected Kikuchi band 21 positions of defective data point 31 is carried out with the simulated Kikuchi patterns related to the crystal data of the neighboring data points 32. Hence, an unambiguous solution is found even in a tie of neighboring data points with different crystal orientations and/or phase. In other words, the method of the invention is not driven by the highest number of neighboring data points 32 with the same crystal information and thus the chances for erroneous attribution of crystal information to defective data point 31 is significantly reduced. Also in the example of FIG. 5, the data point "C" is finally attributed the crystal information "B".

REFERENCE NUMBERS 10 sample holder
12 sample
20 Kikuchi pattern
21 Kikuchi band
30 EBSD/TKD map
31 defective data point
32 first neighboring data point
33 second neighboring data point
40 aperture extension
60 EM/SEM
61 electron lens
62 pole piece (magnetic pole)
64 TKD detector
65 phosphor screen
67 EDS detector
68 active area of EDS detector
70 control unit
80 electron beam
81 characteristic X-rays
82 transmitted and diffracted electrons (for Kikuchi pattern)

The invention claimed is:

1. A method for improving an EBSD/TKD map comprising a plurality of data points, each data point being assigned to a corresponding grid point of a sample grid and representing crystal information based on a Kikuchi pattern detected for the grid point, the method comprising:
   determining a defective data point of the EBSD/TKD map and a plurality of non-defective neighboring data points of the defective data point;
   comparing Kikuchi bands of a Kikuchi pattern detected for a grid point corresponding to the defective data point with at least one simulated Kikuchi pattern corresponding to crystal information of the plurality of non-defective neighboring data points; and
   assigning crystal information of one of the plurality of non-defective neighboring data points to the defective data point based on the comparing.

2. The method according to claim 1, wherein assigning the crystal information of one of the plurality of non-defective neighboring data points comprises:
   assigning, to the defective data point of the EBSD/TKD map, the crystal information of the plurality of non-defective neighboring data points being associated with the at least one simulated Kikuchi pattern matching the Kikuchi bands of the Kikuchi pattern detected for the grid point corresponding to the defective data point.

3. The method according to claim 1, wherein
   at least one first neighboring data point is assigned with first crystal information corresponding to a first simulated Kikuchi pattern and at least one second neighboring data point is assigned with second crystal information corresponding to a second simulated Kikuchi pattern, and
   the method further comprising the steps of:
   comparing the Kikuchi bands of the Kikuchi pattern detected for the grid point corresponding to the defective data point with the first simulated Kikuchi pattern and with the second simulated Kikuchi pattern;
   determining one of the first simulated Kikuchi pattern and the second simulated Kikuchi pattern having the best match with the Kikuchi bands; and
   assigning, to the defective data point, the crystal information of the determined one of the first simulated Kikuchi pattern and the second simulated Kikuchi pattern having the best match with the Kikuchi bands.

4. The method according to claim 3, wherein the comparing the Kikuchi bands of the Kikuchi pattern detected for the grid point corresponding to the defective data point with the first simulated Kikuchi pattern and the second simulated Kikuchi pattern meets a second matching threshold,
   wherein the determining one of the first simulated Kikuchi pattern and the second simulated Kikuchi pattern having the best match with the Kikuchi bands comprises: determining the best match with the Kikuchi bands by using an additional matching parameter.

5. The method according to claim 1,
wherein a first matching threshold is used in comparing the detected Kikuchi bands of the Kikuchi pattern for the grid point corresponding to the defective data point with the at least one simulated Kikuchi pattern corresponding to the crystal information,
wherein a second matching threshold is used in the comparing the Kikuchi bands of the Kikuchi pattern detected for the grid point corresponding to the defective data point with the at least one simulated Kikuchi pattern corresponding to crystal information of the plurality of non-defective neighboring data points, and
wherein the second matching threshold is below the first matching threshold.

6. The method according to claim 5, wherein the first matching threshold, the second matching threshold, and/or a matching parameter comprises a number of detected Kikuchi bands of the Kikuchi pattern matching Kikuchi bands of the at least one simulated Kikuchi pattern and/or comprises a band mismatch value for matching the detected Kikuchi bands with their corresponding Kikuchi bands of the at least one simulated Kikuchi pattern.

7. The method according to claim 1, wherein the defective data point is determined as a data point representing void crystal information.

8. The method according to claim 1, wherein each data point of the EBSD/TKD map is assigned a matching parameter characterising a matching between the Kikuchi bands of the Kikuchi pattern detected for the grid point and the at least one simulated Kikuchi pattern corresponding to the crystal information of the data point of the EBSD/TKD map, and wherein the defective data point is determined based on the matching parameter.

9. The method according to claim 1, wherein the defective data point of the EBSD/TKD map is determined as a data point for which a number of non-defective neighboring data points with different assigned crystal information exceeds a predetermined threshold.

10. A method for determining a sample structure, the method comprising:
obtaining an EBSD/TKD map with a plurality of data points, each data point being assigned crystal information for a corresponding point of a sample grid;
determining a defective data point of the EBSD/TKD map and a plurality of non-defective neighboring data points of the defective data point;
comparing Kikuchi bands of a Kikuchi pattern detected for a grid point corresponding to the defective data point with at least one simulated Kikuchi pattern corresponding to crystal information of the plurality of non-defective neighboring data points; and
assigning crystal information of one of the plurality of non-defective neighboring data points to the defective data point based on the comparing.

11. The method according to claim 10, wherein the obtaining the EBSD/TKD map with the plurality of data points comprises performing, for each point of the sample grid of a sample:
irradiating the sample with an electron beam at the corresponding point of the sample grid and detecting diffracted electrons exiting the sample and forming a Kikuchi pattern on an active area of a detector;
identifying a plurality of Kikuchi bands in the detected Kikuchi pattern formed on the active area of the detector;
comparing the identified plurality of Kikuchi bands with Kikuchi bands of a plurality of simulated Kikuchi patterns and determining a matching simulated Kikuchi pattern based on the comparing, and
determining crystal information corresponding to the matching simulated Kikuchi pattern and assigning the crystal information to a corresponding data point of the EBSD/TKD map.

12. The method according to claim 11, wherein the identifying a plurality of Kikuchi bands in the detected Kikuchi pattern comprises using a Hough transform of the detected Kikuchi pattern formed on the active area of the detector.

13. The method according to claim 11, wherein each Kikuchi band of the identified plurality of Kikuchi bands in the detected Kikuchi pattern is characterized by an inclination value and a distance to a set reference point.

14. A measurement system, comprising:
an electron microscope including:
an EBSD detector and/or a TKD detector; and
a control unit configured to perform the method for determining the sample structure according to claim 10.

* * * * *